United States Patent [19]

Shibuya et al.

[11] Patent Number: 5,524,562
[45] Date of Patent: Jun. 11, 1996

[54] MOVABLE TABLE APPARATUS FOR MOVING A WORK HOLDER OF A SEWING MACHINE

[75] Inventors: Shoichi Shibuya; Takayuki Shiina; You Oda; Tadayoshi Minakawa, all of Chofu, Japan

[73] Assignee: Juki Corporation, Tokyo, Japan

[21] Appl. No.: 405,508

[22] Filed: Mar. 16, 1995

[30] Foreign Application Priority Data

Mar. 17, 1994 [JP] Japan .................................. 6-047023

[51] Int. Cl.⁶ .............................. D05B 21/00; D05C 9/04
[52] U.S. Cl. ........................ 112/103; 112/470.14; 269/73
[58] Field of Search .................... 112/103, 102.5, 112/102, 470.06, 470.07, 470.09, 470.14, 470.18, 475.18, 475.19; 248/913; 269/71, 73

[56] References Cited

U.S. PATENT DOCUMENTS

| | | | |
|---|---|---|---|
| 4,195,581 | 4/1980 | Ohara | 112/103 |
| 4,280,420 | 7/1981 | Nishida et al. | 112/103 |
| 5,003,895 | 4/1991 | Talanker | 112/103 |
| 5,005,501 | 4/1991 | Kita | 112/103 X |
| 5,337,685 | 8/1994 | Badillo | 112/470.14 |

*Primary Examiner*—Peter Nerbun
*Attorney, Agent, or Firm*—Morgan & Finnegan

[57] ABSTRACT

A movable table apparatus includes a table in the form of a quadrilateral with four sides with two pairs perpendicular to each other, a pair of first fixed guide rails corresponding to the first pair of sides, and a pair of second movable guide rails corresponding to the second pair of sides. The table is adapted for movement in X and Y directions and is fabricated at a low overall height so that the apparatus may be lightweight and compact, thus requiring fewer parts and affording ready assembly. A work clamp support arm with a work clamp is rigidly mounted on a pair of the second and movable guide rails.

8 Claims, 6 Drawing Sheets

MOVABLE TABLE APPARATUS FOR MOVING A WORK HOLDER OF A SEWING MACHINE

FIELD OF THE INVENTION

This invention relates to a movable table apparatus such as an X-Y running table of a sewing device that can be used to form a large variety of patterns with stitches. In such a sewing device, the patterns are generated by the cooperation of two rectilinear movements that intersect one another on the plane where the stitches are formed.

BACKGROUND OF THE INVENTION

An X-Y table apparatus which is adapted to move a work holder in either the X or Y direction is well known in the art and is taught, for example, in Japanese Patent Publication Nos. Sho 62-47555, Sho 63-9477, and Sho 63-13715.

More specifically, a movable table apparatus disclosed in Sho 62-47555 is arranged to stack an X-slide table over a Y-slide table, and thus requires a massive drive mechanism. The movable table unit shown in Sho 63-9477 is fabricated to move an X-Y table to be in line with an X-guide shaft and a Y-guide shaft, which renders the structure complicated and requires a large amount of space. The movable table device illustrated in Sho 63-13715 is also a complicated and massive structure since it utilizes X-Y axes travelling beds, X-Y axes travelling rails, and X-Y movable frames to move a work holder york.

A conventional apparatus that utilizes X-Y tables is shown in FIG. 5 and includes an X-running table 41, a Y-running table 43, and a coupling 42 that couples the Y-running table 43 to the X-running table 41 at an angle of 90°. A work-holder arm 44 is fastened on the Y-running table 43, and 45 indicates a work-holder supported by the work-holder arm 44; i.e., the thing which fastens the Y-running table 43 to slide freely on the X-running table with the coupling 42, is this conventional table. Of course, an X-Y running table in which the X-running table is placed on the Y-running table is also available.

The conventional X-Y running table of FIG. 5 enables movements in both the x and y directions by the illustrated orthogonal placement of the two rectilinear tables. However, such conventional X-Y running tables have certain disadvantages due to this organization of the two rectilinear running tables.

For example the heavier the weight loaded on the table becomes, the thicker the table needs to be to maintain satisfactory stiffness and strength. Also, the number of coupling members that are needed to fasten the two recti-linear running tables in the perpendicular arrangement on the plane is fairly large, as shown in FIG. 6, and the total weight of these coupling members will disturb a light table.

Furthermore, the large number of table components require a considerable time for proper assembly and adjustment.

However, the disadvantages can not be removed because the guide rails and the slide rails are screwed along the sides on the table and so components for a complete X-Y running table are still large in number.

SUMMARY OF THE INVENTION

The disadvantages of the prior art have been overcome by the present invention which features, in a preferred embodiment, a movable table apparatus for moving an element in two intersecting directions comprising: a movable table having a pair of X-guides formed on opposite sides parallel to each other and a pair of Y-guides formed on other parallel opposite sides intersecting with the opposite sides on which the X-guides are formed, wherein the pairs of guides are integrally formed and the movable table is connected to a drive source; a pair of fixed guide rails extending along either one of the X-guides or the Y-guides and rigidly mounted on a frame; and a pair of movable rails extending along either the other one of the X-guides or the Y-guides and rigidly mounted on the moving element.

Other features of the invention will be apparent from the following detailed description.

BRIEF DESCRIPTION OF THE DRAWINGS

The invention will be described in greater detail below by the way of reference to the accompanying drawings, wherein.

DETAILED DESCRIPTION OF THE PREFERRED EMBODIMENTS

Figure 1:
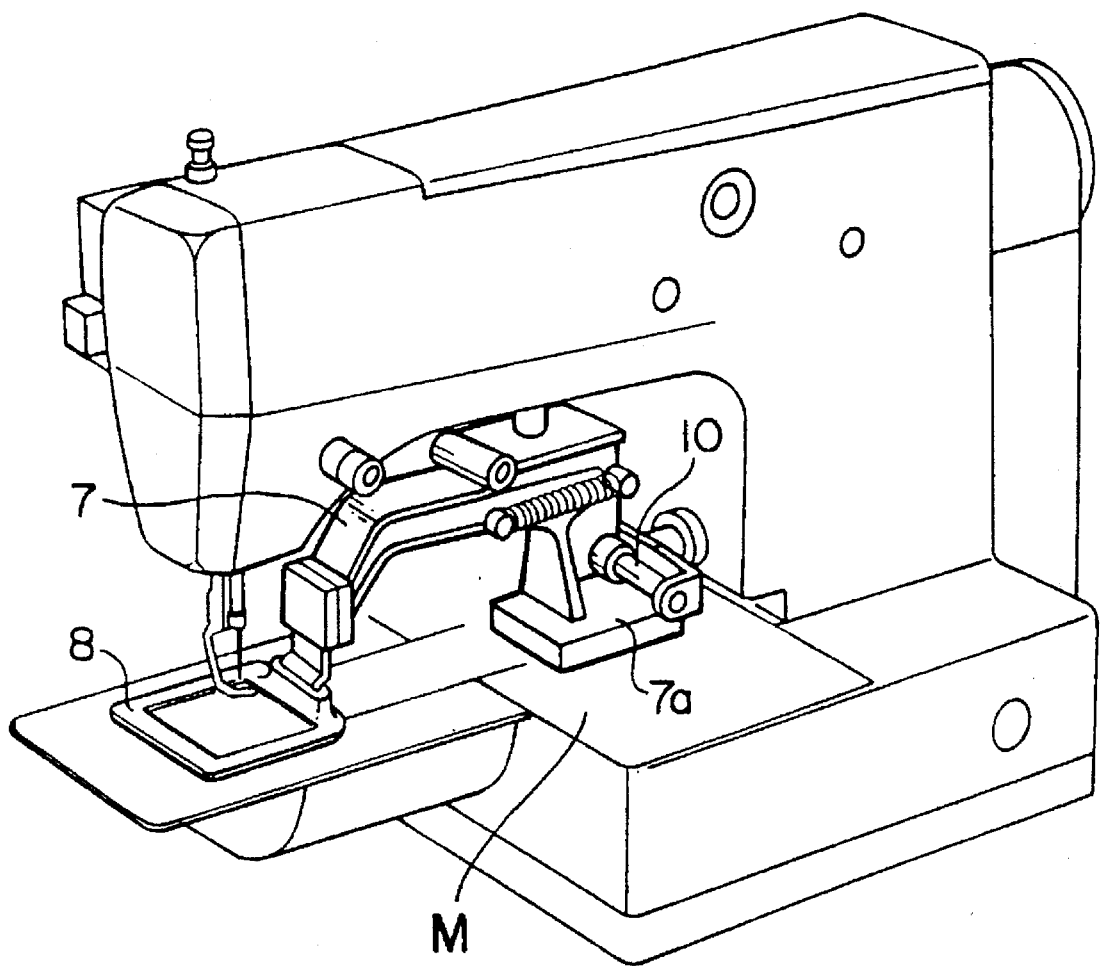
FIG. 1 is a representation schematically showing a movable table for a pattern sewing device embodying the present invention.
Figure 2:
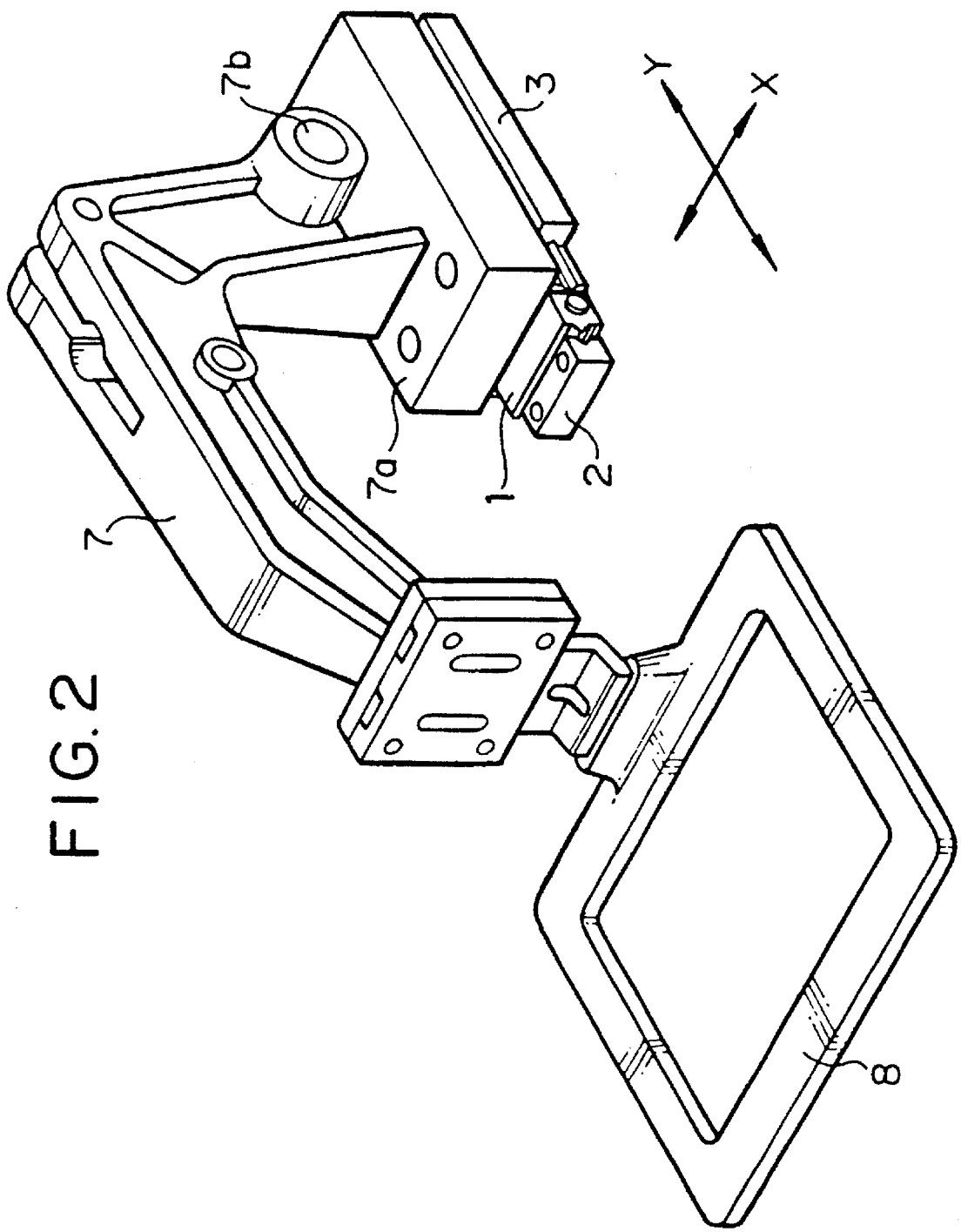
FIG. 2 is a perspective view showing the movable table of FIG. 1.
Figure 3:
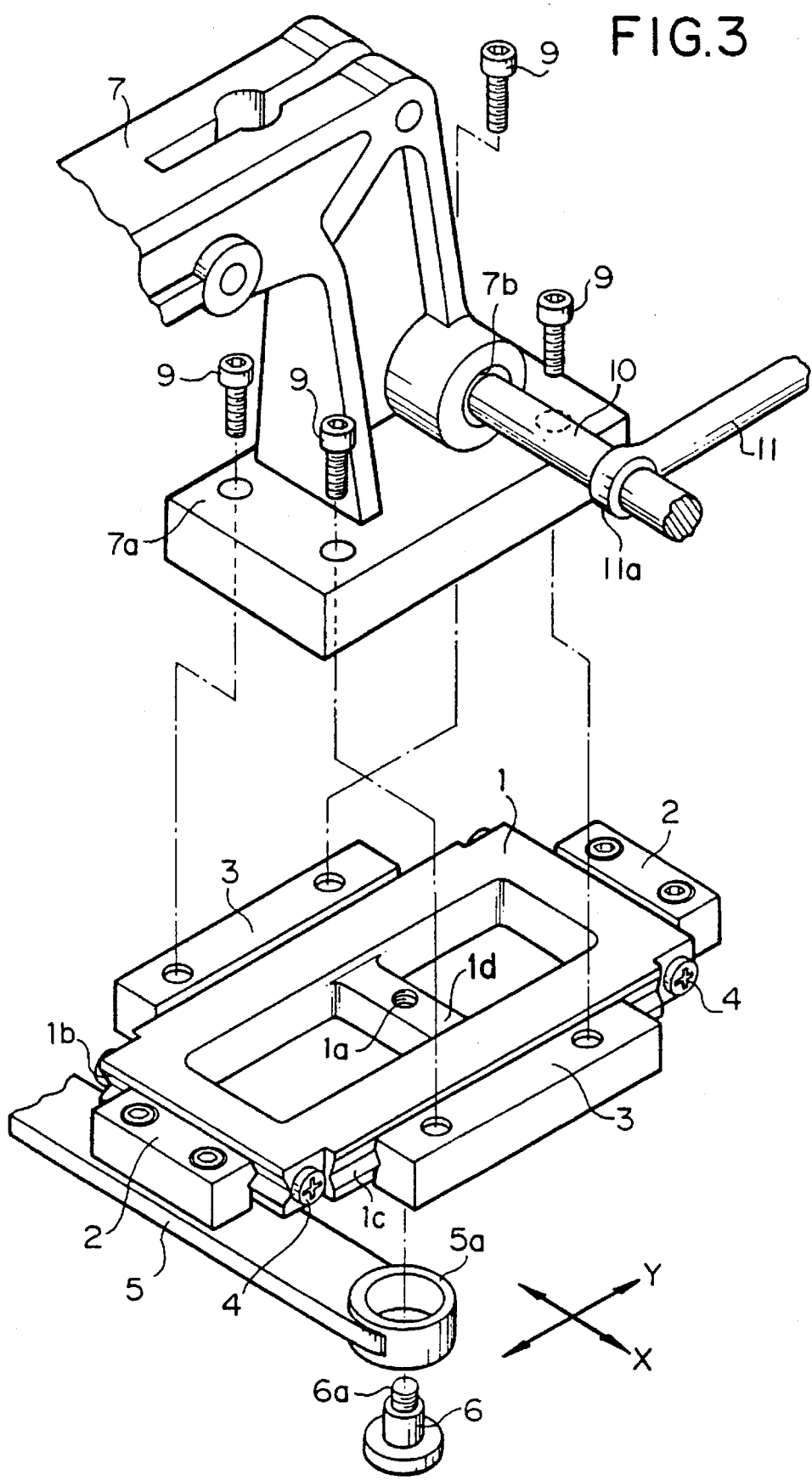
FIG. 3 is a perspective and fragmentary view showing the movable table of FIG. 1, which further illustrates the relationship among running tables, rails, fastening members and driving members.

A first embodiment of the invention is shown in FIGS. 1–3 wherein 1 indicates a running table, 2 indicates a first rail, 3 indicates a second rail, 4 indicates a screw that keeps the rolling device in an appropriate place, 5 indicates the X-driving rod as the first driving member, 6 indicates a pivot screw, 7 indicates a work holder arm, 8 indicates the work holder, 9 indicates a screw, 10 indicates a guide rod, and 11 indicates the Y-driving rod as the second driving member.

The running table 1 is, as shown in the figures, a rectangular one and the grooves indicated as 1b and 1c are made into each of the four side faces of the table 1 respectively. Table 1 also has a threaded hole 1a at its center. As shown in FIG. 3, the first rail 2 is placed parallel to the groove 1b, and the second rail 3 is placed parallel to the groove 1c.

The first rails 2 are screwed on the not shown frame of the sewing device, and the not shown rolling devices exist between the groove in the first rail and the groove 1b. Consequently, the table 1 put between two first rails can slide freely along the longer side of the first rail 2, indicated as the route X shown in FIG. 3.

The second rails 3 are movable, and are fastened to the work holder arm as described below, and the not shown rolling devices also exist between the groove in the second rail and the groove 1c. Consequently, the table put between two second rails can slide freely along the second rail 3, indicated as the Y-route shown in FIG. 3. The screws indicated as 4 are screwed in near the corners of the longer side of the table 1 and the heads of the four screws keep the rolling devices as mentioned above in the right position.

The X-driving rod 5 driven along the X-route is connected to the running table 1. That is, a link indicated as 5a of the X-driving rod 5 is screwed, such that it freely rotates, to the under surface of the threaded hole 1a in beam 1d with the pivot screw 6. A sewing machine driving motor or a stepping motor can drive the rod 5 through a control train that is composed of a cam mechanism, for example.

Both the first rails and second rails, indicated as 2 and 3 respectively, are appropriately placed in the bed M of the sewing device and the work holder arm 7, which is provided to move freely on the bed M, is fastened to the movable second rails. That is, the second rails are screwed to the under surface of the base 7a of the work holder arm 7 with the screws 9. A not shown opening is provided on the upper surface of the bed M and the opening allows the free movement of the arm 7 as mentioned. The work holder arm 7 has a square-like work holder 8 on the other end.

The Y-driving rod 11 driven along the Y-route is connected to the work holder arm 7. That is, the hole 7b is perforated through the arm along the X-route and the hole keeps the guide rod 10 sliding freely in it. The guide rod 10 and the link 11a are assembled to slide freely. The sewing machine driving motor or the stepping motor also can drive the Y-driving rod through the control train, mentioned above.

As is mentioned, in the X-Y running device for the sewing device, the movement along the X-route of the X-driving rod 5, which is connected to the threaded hole 1a in the running table 1 with the pivot, drives the table 1 along the longer side of the fixed first rail 2, and the movement along the Y-route of the Y-driving rod 11, which is connected to the guide rod 10 that is inserted into the hole 7b in the work holder arm 7, drives the work holder arm, which is fixed on the movable second rail 3, along the longer side of the table 1. The work holder 8 that is fastened to the other end of the work holder arm can move simultaneously along both the X-route and Y-route, and, therefore, a large variety of patterns can be generated under the not shown needle of the sewing machine.

The disclosed X-Y running table requires only one plane running table 1 and does not require the vertically piled table as in the conventional device. Therefore, the disclosed invention can be made substantially thinner than the prior art devices. In addition, the table 1 is also serving as a slide rail and does not require the coupling of members to pile two tables up. Therefore, the table can be made light in weight.

Table 1 with the grooves 1b and 1c in the four side faces does not require the guide rails, the slide rails and fastening screws, and so there is no need to pay attention to assembling these rails appropriately. Therefore, such a table is more light weight and easier to assemble than the X-Y running table of the prior art.

The invention is also distinguished from the prior art in that one of the two pairs of rails is immovable (the pair of first rails for example), and the other pair of the two rails is movable (the pair of second rails for example) along a route. A first driving member, which is mainly composed of, e.g., the X-driving arm, drives the table 1 along a route that intersects with the longer side of the movable rails mentioned above. The work holder arm with the work holder is fastened on the movable rails mentioned above, and then the second driving member is connected to the work holder arm, the second driving member being mainly the Y-driving arm that drives the work holder arm along the longer side of the movable rail.

According to this invention, a thinner table with fewer components can be formed by providing only a pair of the first rails and a pair of the second rails, then arranging them to form a quadrilateral that has two parallel sides on the same level around the running table, with one of the two pairs of the rails immovable and the other pair of the rails movable along the longer side of the table. Consequently, the table can be light in weight and easily assembled.

As mentioned, a large variety of work holders for pattern sewing can also be driven along the two routes that are intersecting with one another by connecting the first driving member to the table and also connecting the second driving member to the arm.

Figure 4:
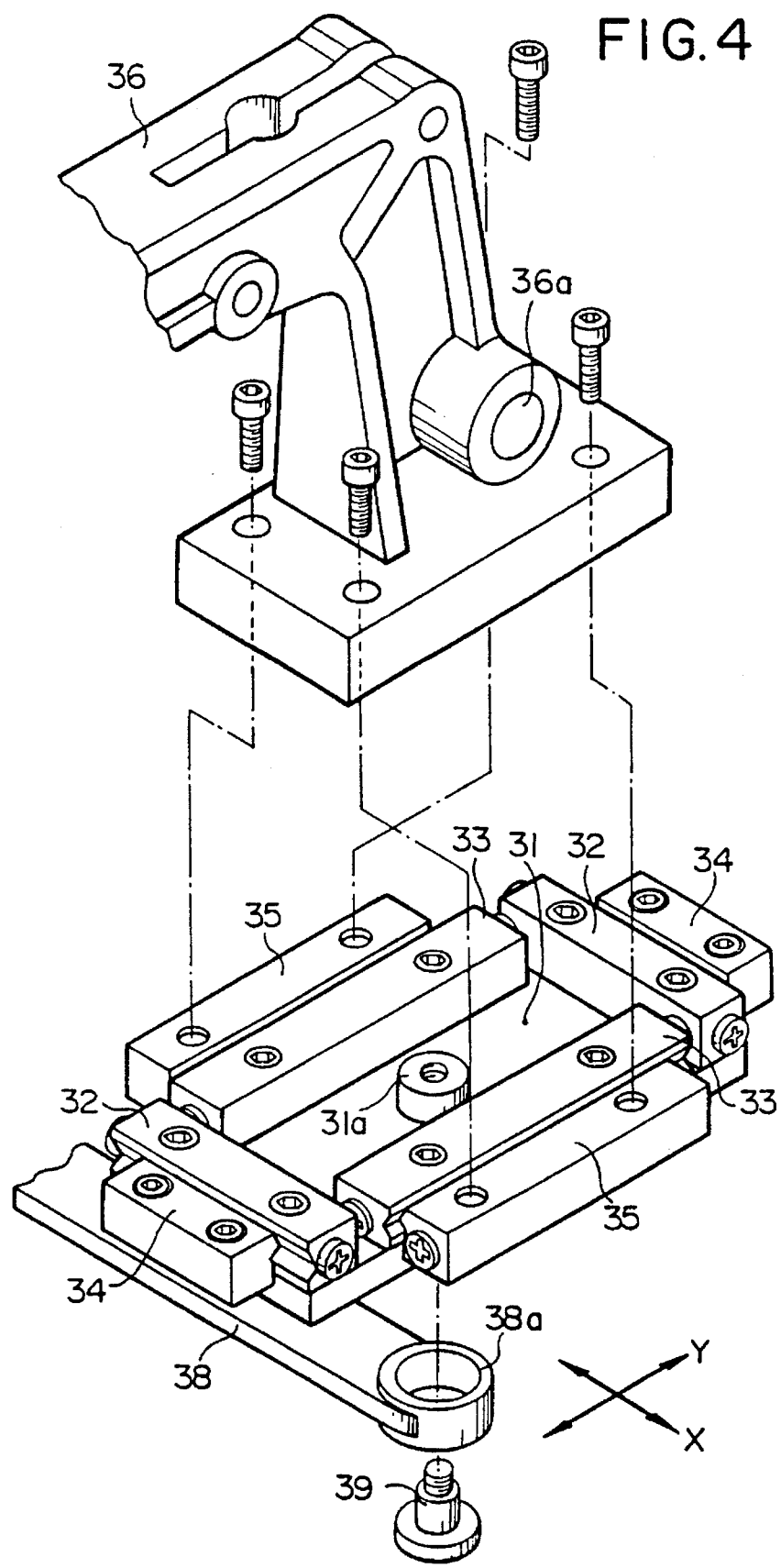
FIG. 4 is a perspective and fragmentary view showing a second embodiment of the invention.
Figure 5:
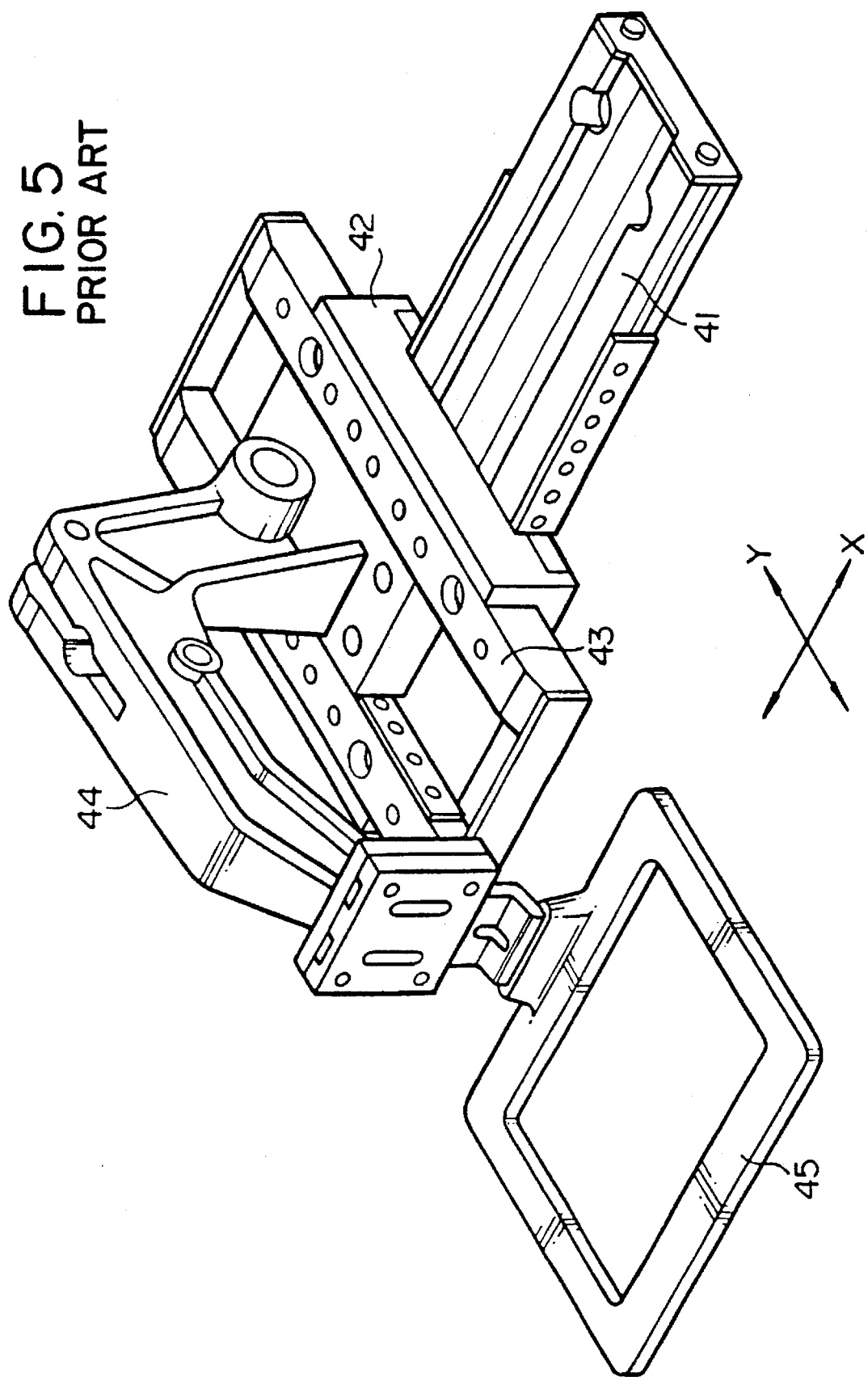
FIG. 5 is a perspective view showing a prior art table.
Figure 6:
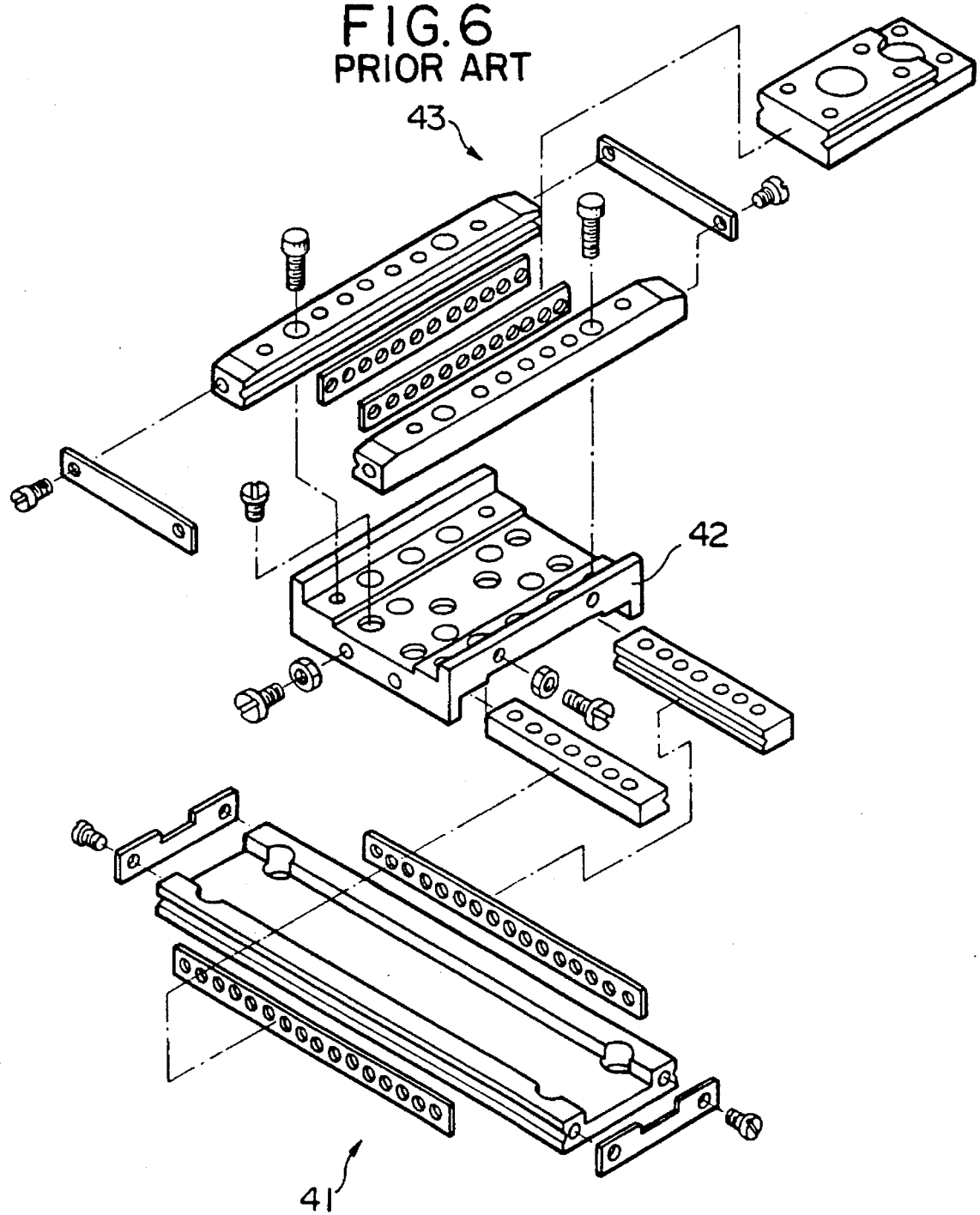
FIG. 6 is a perspective and fragmentary view showing a prior art table.

A second embodiment of the invention is illustrated in FIG. 4 and includes an X-running table 31, a slide rail 32 for the table's X-movement (hereinafter referred to as the "X-slide rail") fixed on table 31, a guide rail 33 for the table's Y-movement (hereinafter referred to as the "Y-guide rail") fixed on the table 31, a guide rail 34 for the table's X-movement (hereinafter referred to as the "X-guide rail") fixed on a frame of the sewing device (not-shown). Also not shown is a rolling device between the X-guide rail and the X-slide rail 32.

Also illustrated in FIG. 4 is a work-holder arm 36 (work-holder not shown), a slide rail 35 is fixed on the bottom surface of the arm 36 for the arm's Y-movement (hereinafter referred to as the "Y-slide rail"). The device also includes a rolling device (not shown) between this slide and the Y-guide rail 33. A driving arm 38 drives the table 31 along the X-guide rail 34 (hereinafter referred to as X-driving arm), and a screw 39 fastens the X-driving arm to freely rotate to a threaded hole 31a of the table 31 such that the X-driving arm will freely rotate. A rod (not shown) is inserted into a hole 36a cut through the arm 36 and the rod is connected to a driving arm (not shown) that drives the arm 36 along the Y-guide rail 33.

The X-slide rail is placed along each of to parallel sides of the table 31 and the Y-guide rail along each of the other parallel sides, on the plane table, as mentioned above.

Although the invention has been described by way of reference to the preferred embodiments disclosed herein, it should be understood that the invention is not limited to these disclosed embodiments. Rather, other examples of the invention will be covered by the appended claims.

What is claimed is:

1. A movable table apparatus, comprising:

an element;

a movable table having a pair of X-guide means integrally formed on first opposite sides parallel to each other and a pair of Y-guide means integrally formed on second parallel opposite sides intersecting with said first opposite sides, said movable being connected to a drive source;

a pair of fixed guide rails extending along one of said X-guide means and said Y-guide means and rigidly mounted on a frame: and a pair of movable rails extending along the other one of said X-guide means and and said Y-guide means and rigidly mounted on said element, wherein said element is movable in two intersecting directions.

2. The movable table apparatus of claim 1 wherein each of said X-guide means and said Y-guide means comprises a groove in a respective side face of said movable table.

3. The movable table apparatus of claim 1 wherein said fixed guide rails are rigidly mounted on said element.

4. The movable table apparatus of claim 3 wherein said element comprises a work holder for a sewing device.

5. A movable table apparatus, comprising:

an element:

a movable table having a pair of X-guide means integrally formed on first opposite sides parallel to each other, a pair of Y-guide means integrally formed on second parallel opposite sides intersecting with said first opposite sides Ion which said X-guide means are formed, and a beam integrally formed between one of said pair of X-guide means and said Y-guide means, said beam being connected to a drive source;

a pair of fixed guide rails extending along one of said X-guide means and said Y-guide means and rigidly mounted on a frame;

and a pair of movable rails extending along the other one of said X-guide means and said Y-guide means and rigidly mounted on said element, wherein said element is movable in two intersecting directions.

6. The movable table apparatus of claim 5 wherein each of said X-guide means and said Y-guide means comprises a groove in a respective side face of said movable table.

7. The movable table apparatus of claim 5 wherein said fixed guide rails are rigidly mounted on said element.

8. The movable table apparatus of claim 7 wherein said element comprises a work holder for a sewing device.

* * * * *

UNITED STATES PATENT AND TRADEMARK OFFICE
CERTIFICATE OF CORRECTION

PATENT NO. : 5,524,562
DATED : June 11, 1996
INVENTOR(S) : Shibuya, et. al.

It is certified that error appears in the above-indentified patent and that said Letters Patent is hereby corrected as shown below:

column 2, line 57, delete "longer side of the";

column 3, line 27, delete "which is";

column 3, line 30, delete "which is";

column 4, line 34, delete "to" and insert --two--.

Column 4, claim 1, line 7, after "movable", insert --table--;
Column 5,
claim 5, line 7, delete "Ion which said X-guide means are formed".

Signed and Sealed this

Twenty-seventh Day of August, 1996

Attest:

BRUCE LEHMAN

Attesting Officer     Commissioner of Patents and Trademarks